(12) United States Patent
Steckel

(10) Patent No.: US 8,915,411 B2
(45) Date of Patent: Dec. 23, 2014

(54) UTILITY SLIDABLE RACK-RAIL SYSTEM

(75) Inventor: Eric Steckel, Salt Lake City, UT (US)

(73) Assignee: Eric Samuel Steckel, Salt Lake City, UT (US)

( * ) Notice: Subject to any disclaimer, the term of this patent is extended or adjusted under 35 U.S.C. 154(b) by 277 days.

(21) Appl. No.: 13/396,385

(22) Filed: Feb. 14, 2012

(65) Prior Publication Data

US 2012/0205410 A1 Aug. 16, 2012

Related U.S. Application Data

(60) Provisional application No. 61/463,324, filed on Feb. 15, 2011.

(51) Int. Cl.
*B60R 9/04* (2006.01)

(52) U.S. Cl.
USPC ........... 224/324; 224/310; 224/311; 224/315; 224/317

(58) Field of Classification Search
USPC ......... 224/310, 311, 315, 317, 321–324, 326, 224/329, 330
See application file for complete search history.

(56) References Cited

U.S. PATENT DOCUMENTS

| | | | | |
|---|---|---|---|---|
| 3,796,333 A * | 3/1974 | Goldstein | | 414/462 |
| 4,120,435 A * | 10/1978 | Eby | | 224/322 |
| 4,372,568 A * | 2/1983 | Campbell | | 280/63 |
| 4,646,952 A * | 3/1987 | Timmers | | 224/485 |
| 4,744,590 A * | 5/1988 | Chesney | | 280/769 |
| 5,306,156 A * | 4/1994 | Gibbs et al. | | 439/34 |
| 5,460,304 A * | 10/1995 | Porter et al. | | 224/521 |
| 5,582,044 A * | 12/1996 | Bolich | | 70/58 |
| 5,586,702 A * | 12/1996 | Sadler | | 224/521 |
| 5,642,844 A * | 7/1997 | Rector | | 224/401 |
| 5,676,292 A * | 10/1997 | Miller | | 224/524 |
| 6,409,065 B1 * | 6/2002 | Edgerly | | 224/508 |
| 6,494,351 B1 * | 12/2002 | Dean | | 224/324 |
| 6,851,695 B2 * | 2/2005 | Lindenman et al. | | 280/441 |
| 8,210,407 B2 * | 7/2012 | Sautter et al. | | 224/315 |
| 2002/0125281 A1 * | 9/2002 | Byrnes | | 224/310 |
| 2003/0146257 A1 * | 8/2003 | Dean | | 224/319 |
| 2003/0173387 A1 * | 9/2003 | Mitchell | | 224/499 |
| 2004/0123529 A1 * | 7/2004 | Wiese et al. | | 52/6 |
| 2006/0060621 A1 * | 3/2006 | Klinkman et al. | | 224/321 |
| 2008/0197162 A1 * | 8/2008 | Klinkman et al. | | 224/314 |
| 2010/0078454 A1 * | 4/2010 | Sautter et al. | | 224/315 |
| 2011/0139838 A1 * | 6/2011 | Sautter et al. | | 224/321 |

* cited by examiner

*Primary Examiner* — Brian D Nash

(57) ABSTRACT

Utility rack attachments for rack systems used with automobiles, trailers, or stationary objects are used to conveniently transport or store the same. The invented rack system is basically comprised of an easily mountable and slidable assembly unit designed for quick locking to a rail mounted to a vehicle or trailer that is in tow by a vehicle. In a typical setup a quick locking and unlocking assembly unit is mounted to each of two rails that are separated by a distance that is spanned by the load it is carrying or by a platform which carries the load. The slidable and fixable nature of a complete assembly enables a person to quickly mount and dismount it to a rail and position and reposition a load at any location along the rail thus making it very versatile to accommodate a range of objects to be transported.

20 Claims, 16 Drawing Sheets

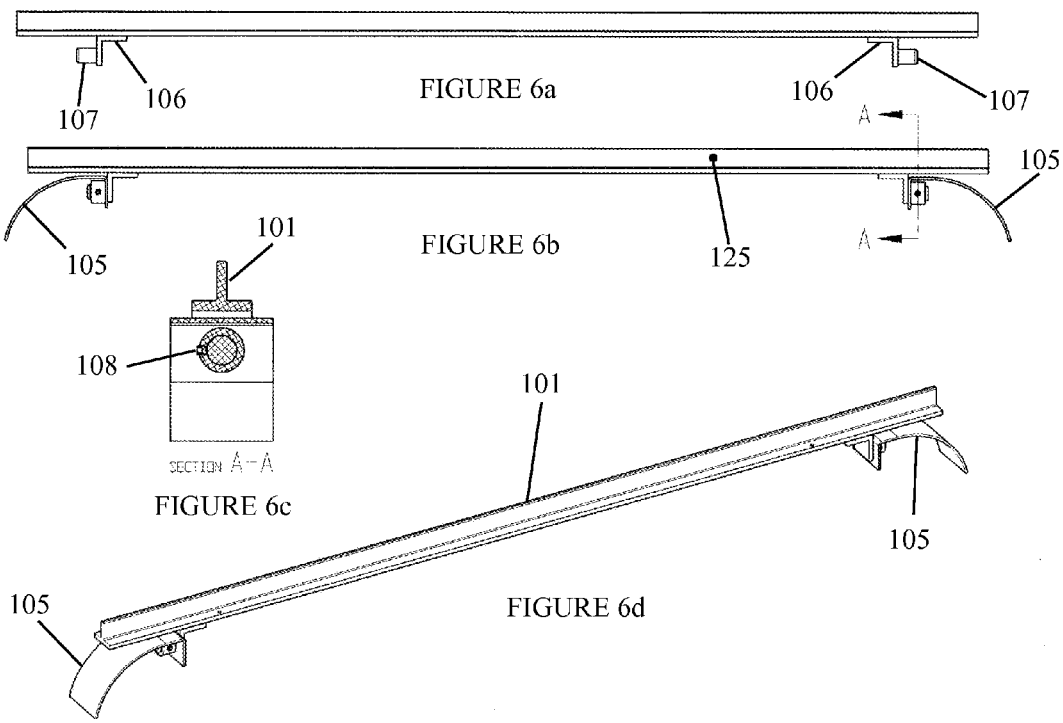
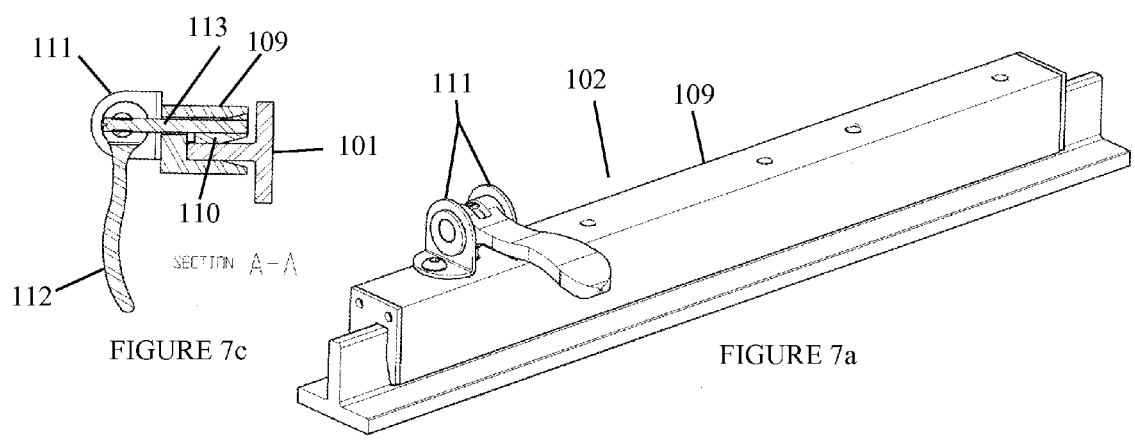
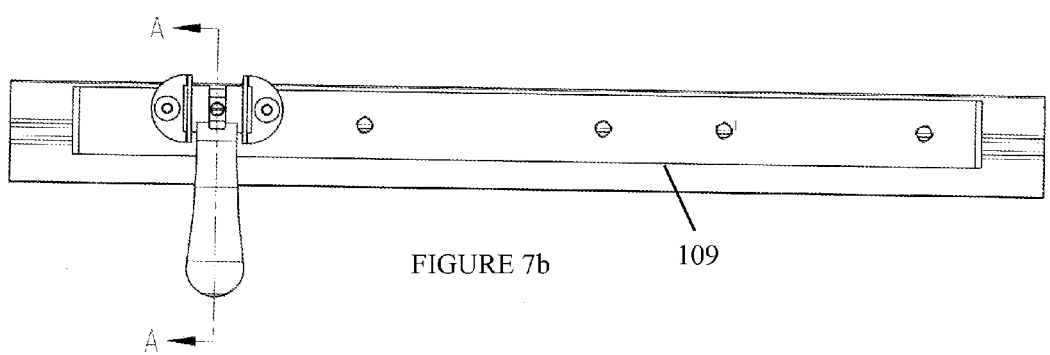

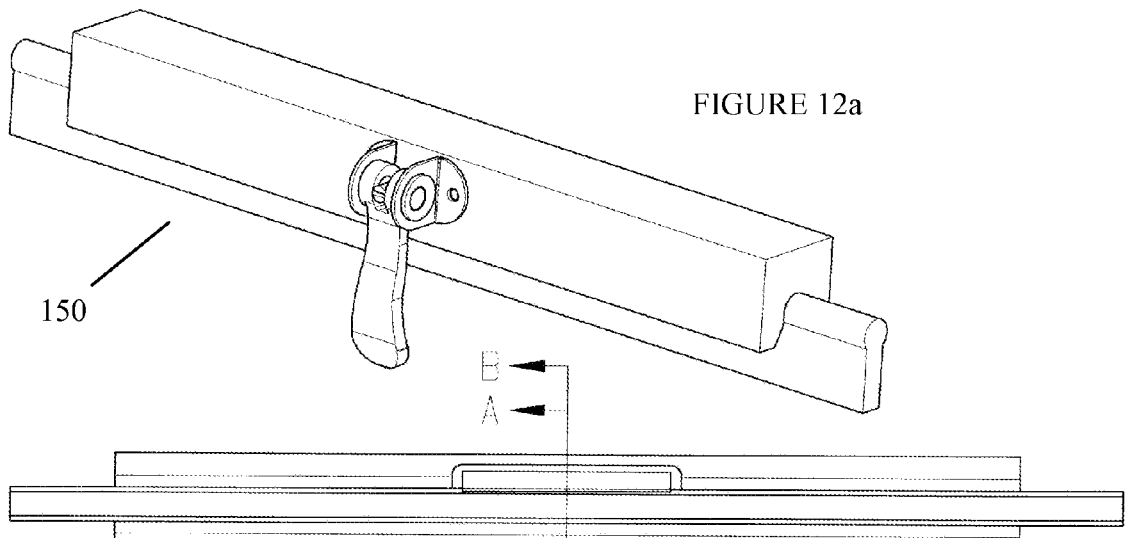
FIGURE 12a
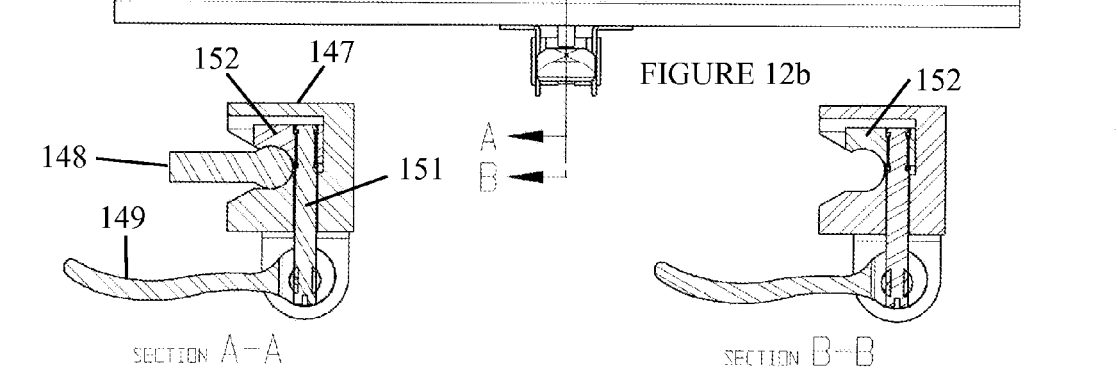
FIGURE 12b
SECTION A-A
FIGURE 12c
SECTION B-B
FIGURE 12d
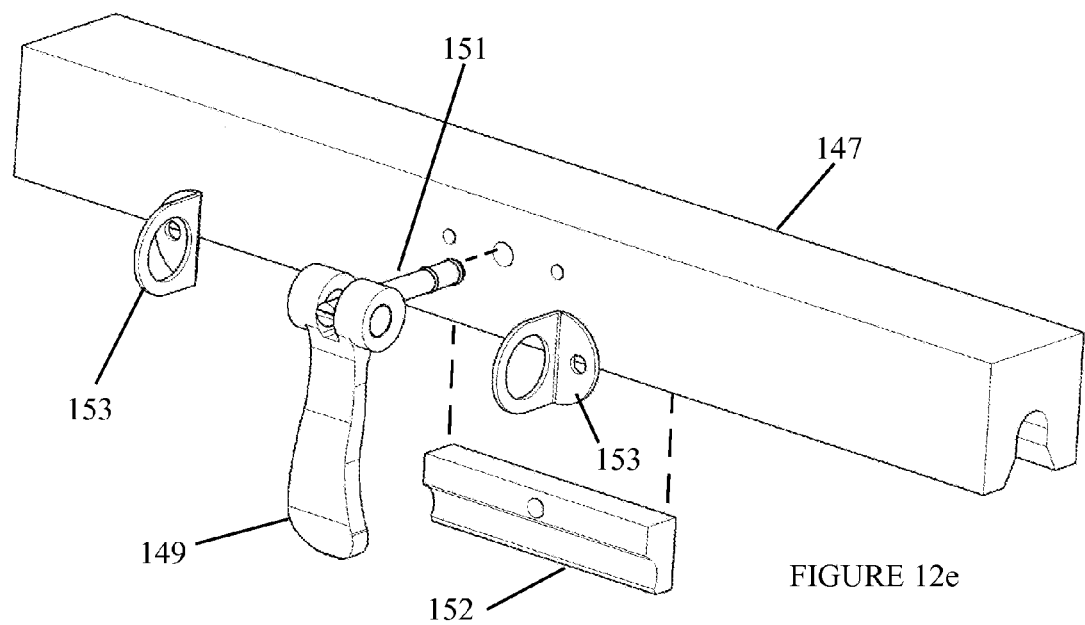
FIGURE 12e

SECTION A-A

SECTION A-A

UTILITY SLIDABLE RACK-RAIL SYSTEM

BACKGROUND AND RELATED ART

Ever since the development of rolling devices (i.e. automobiles, carts, etc.) whether machine powered or not, methods have been devised to transport materials and goods. In the era of automobiles, racks have been optional equipment straight from factories almost since their inception. In the latter part of the 20$^{th}$ century, major improvements were made to conveniently transport materials and goods via automobile or trailer. These systems still utilize the same concept developed at that time which is to semi-permanently attach components to cross bars hereinafter called rails that extend across the automobile's roof. This characteristic makes it difficult to access equipment or storage that is centrally located on the roof and is equally difficult to access if it is on a trailer or a stationary object. Loading equipment on to a semi-permanent rack system when atop an automobile is especially difficult. It can be very cumbersome to manipulate a load while risking damage to your automobile or injuring oneself or both in the process.

Therefore what is needed is a system that mitigates all aforementioned difficulties and risks by employing a slidable and removable cassette that is generic or specific to the equipment, material, or storage container desired to transport. Hereafter equipment and storage container will be referred to as the "load".

OBJECTS AND ADVANTAGES OF THE INVENTION

Rack systems in the current marketplace employ a system or concept that semi-permanently mounts the load to the rails that span widthwise or laterally across the vehicle's roof which makes it at best inconvenient to reposition the load. These systems are not meant to be position adjustable and for obvious reasons this is not desirable. For the same reason that these systems are not adjustable they also do not provide the user with easy means to change or remove the rail-mountable fixturing system or the load-specific componentry required for mounting.

It is therefore an object of the invention to provide an improved equipment and storage rack system.

It is another object of the invention to provide the user with means to position the load at any desirable position along the mounting-rail length.

It is another object of the invention to provide the user with means to securely fix the load in place relative to the rail length.

It is another object of the invention to provide the user with means to quickly and reliably fix and unfix the load along the mounting-rail length.

It is another object of the invention to provide the user with means to mount and fix a variety of loads on the mounting-rail at the same time.

It is another object of the invention to provide the user with means to provide a stable stand for the load when removed from the mounting-rail.

Further objects and advantages of my invention will become apparent from a consideration of the drawings and ensuing description.

BRIEF DESCRIPTION OF INVENTION

The invented rack system is basically comprised of two subassemblies: a rail and a cassette frame. This rack system will allow the user to load equipment, material, or goods on to a cassette that is independent from the mounting rails on which it is fixed in place prior to transportation. The Cassette may be loaded on ground level or at a convenient height before it is lifted on to the rail system that may either mounted to a automobile's roof top or other platform which may be a rear hitch system attached to a vehicle or a trailer that is towed by a vehicle. The Cassette may also be loaded when it is engaged with the mounting rails.

The functional part of the rail assembly as it relates to this invention is a rail that has a shape corresponding to a portion of the cassette that allows both a slidable and fixed engagement with it. There are essentially two types of engagement: an engagement such that it requires greater force to fix the cassette to the rail than it does to release it and the other type of engagement requires greater force to release or disengage the locked elements than it does to lock or fix them together. This latter engagement or mechanism provides a measure of safety for an inadvertent release of the binding mechanism during vehicle travel or load transport that the other engagement does not provide. There are many methods to accomplish both of these engagement types and only a few of the preferred methods are in the ensuing descriptions.

A method that utilizes a mechanism which requires more force to disengage the Cassette from the rail than it does to engage said Cassette, involves a Slidable Bar of said Cassette having a shape to receive a rail with a cross sectional undercut. Hereinafter the mechanism portion of said Cassette that engages or disengages with rails will be referred to as Mounting Bar Assembly. The undercut is a feature such that a portion of the cross section of said rail is narrower by geometric profile on side substantially opposite to direction Mounting Bar Assembly is translated for removal from said rail. In this description the rail is of round shape, but it can also be of any shape with an undercut. The mechanism has a movable element that engages the rail on the undercut side and the movable element is passively forced into contact with the rail by use of a spring. To disengage this assembly the spring must be further compressed than it is in the engaged state, thus rendering a system that operates in a safety state or in a safe mode. The mechanism in this description is actuated using a camming device however it should be noted that any device can be used to actuate this mechanism. It should also be noted that with an appropriate mechanism design the spring can be of any type. Additionally it should be noted that the rail can be of any shape and not necessarily with an undercut.

Another method utilizes similar geometry in the aforementioned mechanism and rail, however this mechanism further compresses the spring during the engagement—the opposite action as that in the aforementioned mechanism.

Yet another method involves a rail and Cassette Slidable Bar that does not have an undercut where engagement occurs. This assembly utilizes a wedge-shaped bar as the movable element that frictionally binds against the rail surface. The wedge is one of the two functional parts of the Mounting Bar Assembly as it relates to this method of attachment. The second functional part of the Mounting Bar Assembly's Slidable Bar has a general cross sectional shape of a channel except that one surface has an inverted matching angle of the wedge. The wedge is preferably actuated by use of a camming or screw actuated device which when operated lifts the wedge against the said correspondingly angled surface causing the wedge to displace both vertically and horizontally. The horizontal displacement results in the frictional binding between one of the rail's surfaces and one of the wedge's surfaces. A reverse operation of the screw-type actuated or camming device will break this friction bind enabling the user to lift the cassette entirely from the rails or to slide it along the rails to any desired position.

It will become evident to the reader in the ensuing detailed description that the orientation of the binding surfaces may be at any angle, relative to vertical as a reference example.

The Cassette is comprised of at least one Mounting Bar Assembly. The preferred design utilizes two such bar assemblies that are attached to a longitudinal member and are separated by a distance along its longitudinal axis to provide stability of the load. It is preferred that one Mounting Bar Assembly is fixed to the said longitudinal member while the second Mounting Bar Assembly has the freedom to both slide along the said longitudinal member and rotate about an axis normal to the sliding direction which makes allowance for the wedge-shaped bar to compensate for an imperfect or non-parallel rail mounting.

The rail assembly is basically comprised of a rail and a base which rigidly supports the rail from the mounting surface. Relating to the wedge shaped Mounting Bar Assembly a key function of the support is to provide an adjustable rotational degree of freedom. This adjustability is necessary to compensate for the curvilinear surface of a vehicle's roof which enables the parallel surface engagement of the rail and Mounting Bar Assembly. If the profile of the rail is round, then this mounting type is not necessary because the round profile has this inherent degree of freedom.

It should be inferred by the reader that the rail or receptacle can be of any shape.

Another benefit of the invented rack system provides means to use the Cassette as a stable storage unit of said equipment, material or goods.

BRIEF DESCRIPTION OF DRAWINGS

FIG. 6 is a representation for one method of a rail assembly.
 a) is a side view of the rail depicting its attachment points to a fixed mounting bracket.
 b) is a side view of the rail mounted to said fixed mounting brackets.
 c) is a cross section of the engagement between said rail and mounting bracket.
 d) is an isometric view of b).
FIG. 12 is a representation of an alternative design depicting a supported round rail and Mounting Bar Assembly.
 a) isometric view of assembly
 b) top view of a)
 c) cross section view of b)
 d) cross section view of b) not including rail
 e) exploded view of a) not including rail

DESCRIPTION OF ILLUSTRATED EMBODIMENT

Figure 1A:
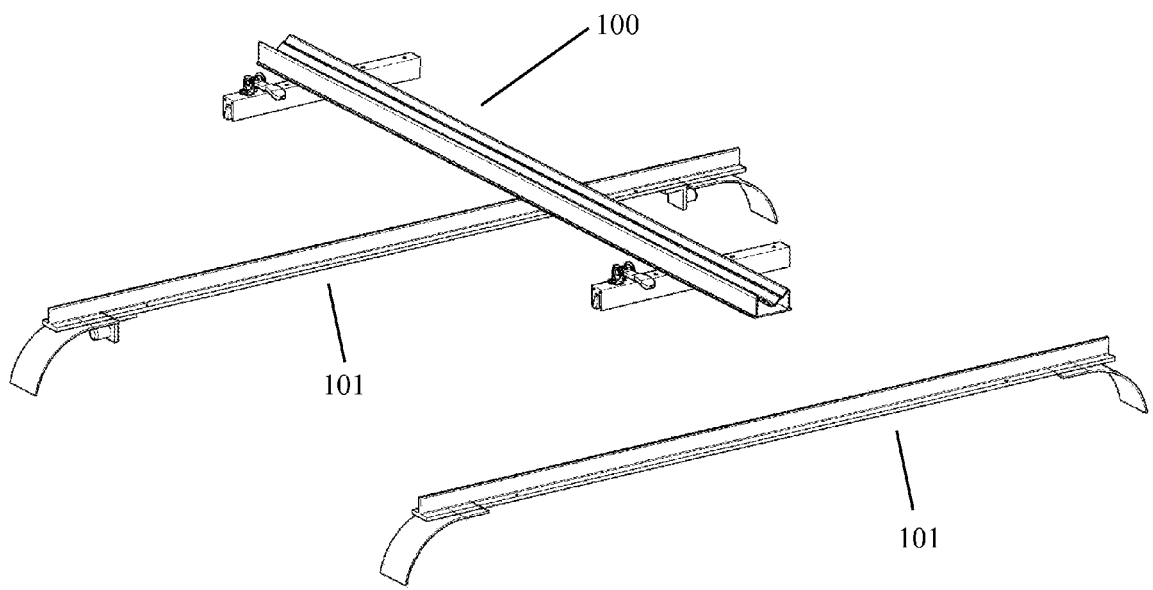
FIG. 1 is a representation of the basic system comprising rails and cassette specific base for a bicycle.
 a) is an exploded view of system in disengaged position.
 b) is a view of system in engaged position.
Figure 1B:
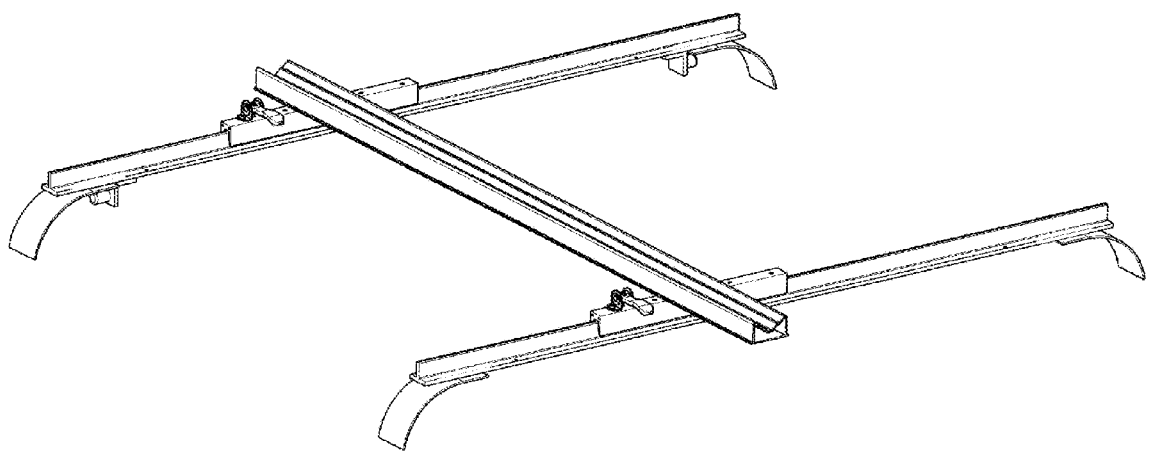
Figure 2:
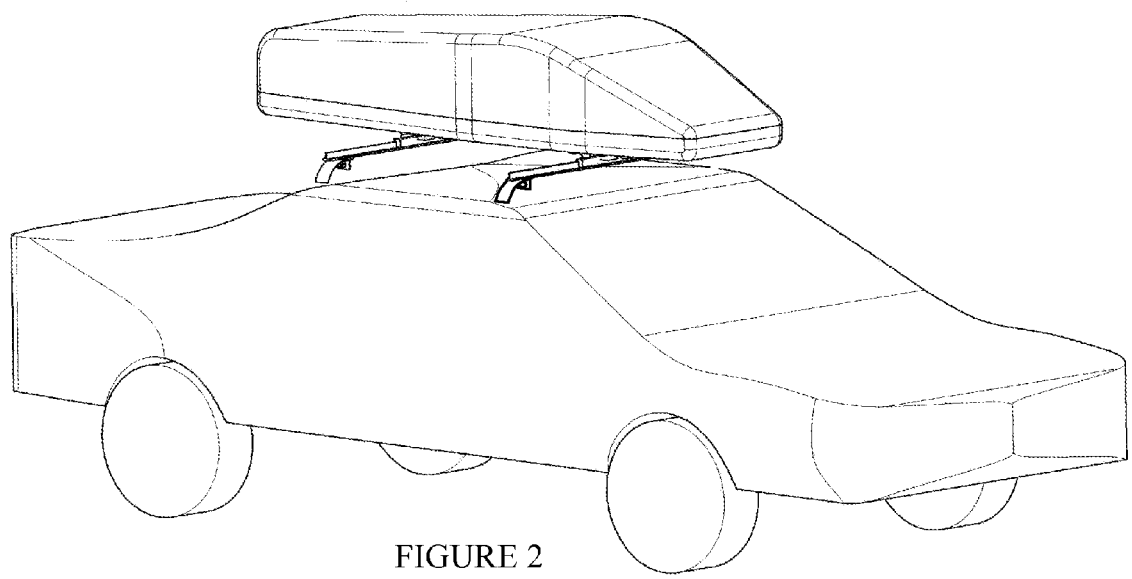
FIG. 2 is an isometric depiction of the system mounted on a vehicle top with the Cassette specific equipment for a cargo carrier.
Figure 3:
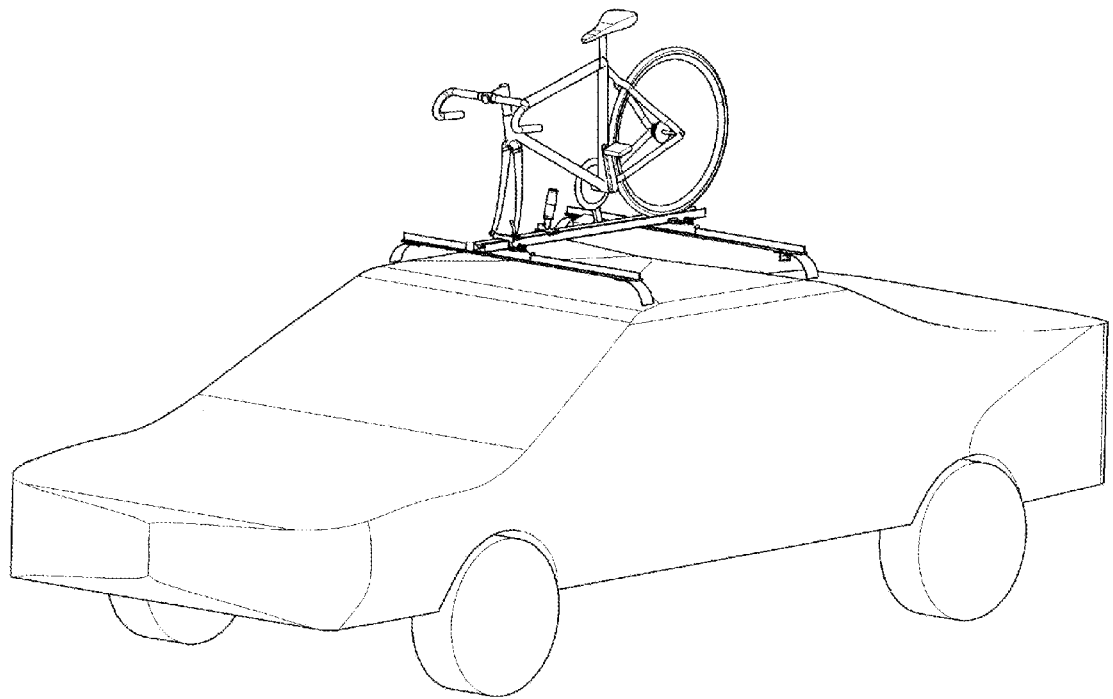
FIG. 3 is an isometric depiction of the system mounted on a vehicle top with the Cassette specific equipment for a bicycle.
Figure 4:
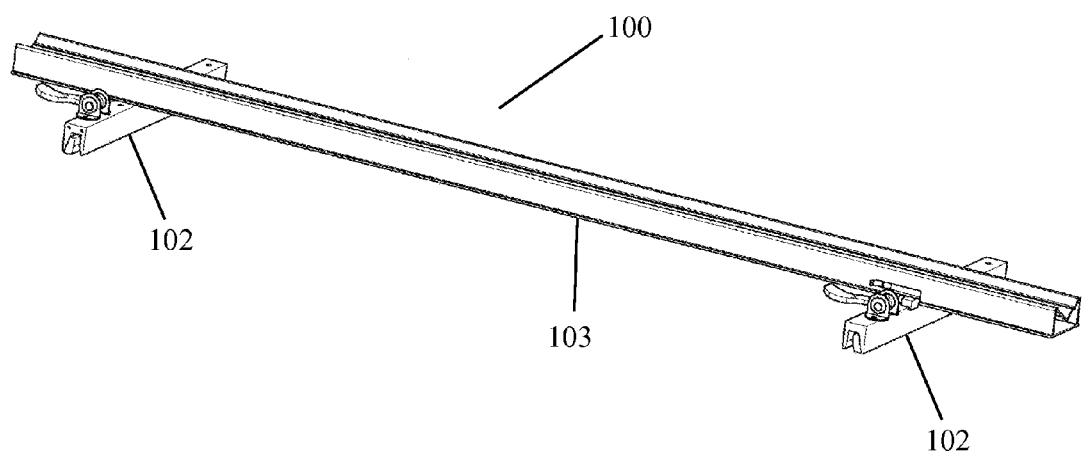
FIG. 4 is an isometric view of the cassette specific base for a bicycle.
Figure 5:
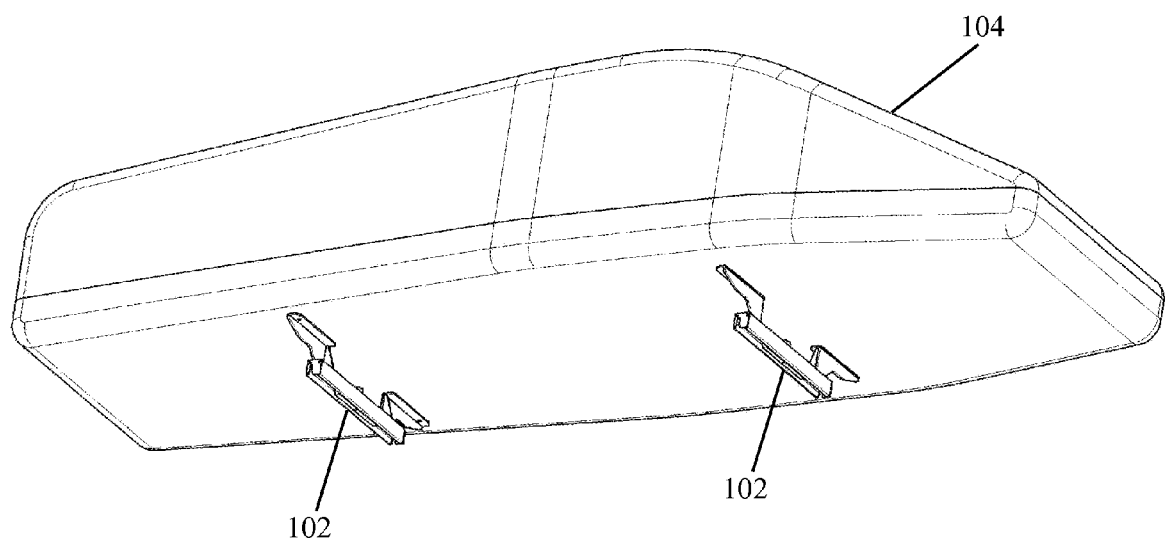
FIG. 5 is an isometric view of the cassette specific base for a cargo carrier.

FIG. 2 and FIG. 3 depict an example how the user may employ the utility of this invention. FIG. 1 are the same as FIG. 3 without the load to show the Cassette 100 of FIG. 4 in both engaged and disengaged positions with Rails 101. In this illustrated example the Cassette 100 is comprised of two Mounting Bar Assemblies 102 depicted in FIG. 4 and one Spanner 103 that connects them both. Spanner heretofore is a generically used term to describe a member linking the Mounting Bar Assemblies. Another example of a Spanner is 104 in FIG. 5 which is the cargo container itself. It is should be evident to the reader that any object being the load can serve as a Spanner.

FIG. 6 depict one design method to achieve a rotationally adjustable Rail 101 necessary to set said Rail 101 surfaces 125 parallel to each other which is essential for engagement with Mounting Bar Assemblies 102 of Cassette 100 of this design type. Support Base 105 utilizes a hollow cylinder with Set Screw 108 to clamp Pin 107 extending from Support Bracket 106 having rotational engagement inside said hollow cylinder.

Figure 7D:
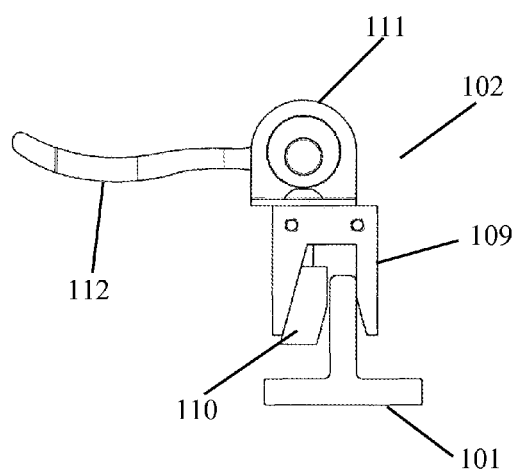
FIG. 7 is a representation of the Mounting Bar Assembly portion of the cassette
 a) is an isometric view of assembly engaged with a short section of rail.
 b) is a top view a).
 c) a cross section of b) depicting how the Mounting Bar Assembly is frictionally engaged with the rail.
 d) is an end view of a) depicting the disengagement of the wedge against the rail.
 e) is an end view of a) depicting the complete separation of the Mounting Bar Assembly from the rail.
 f) Is an exploded view of a) less rail.
Figure 7E:
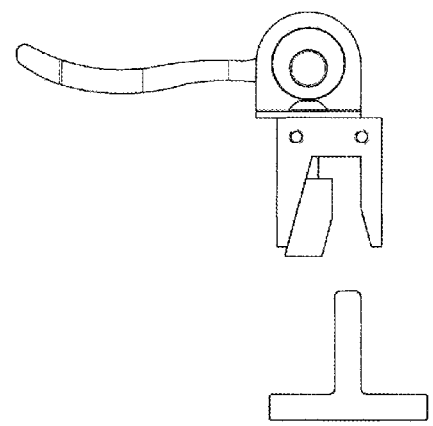
Figure 7F:
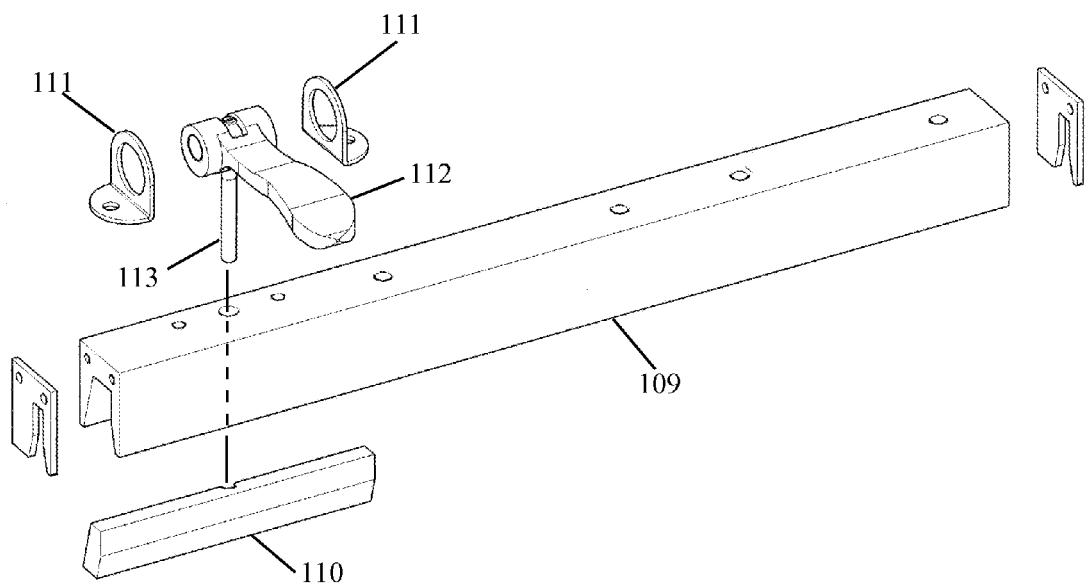
Figure 8A:
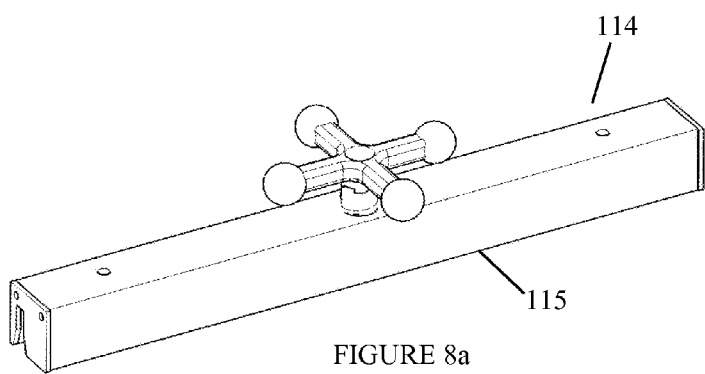
FIG. 8 is a representation of Mounting Bar Assembly depicting a screw-type wedge-lock.
 a) isometric view of assembly.
 b) is a top view of FIG. a).
 c) cross section of the b).
 d) cross section of b) not showing the Bar for clarity.
 e) an exploded view of a).
 f) is an isometric view of a) with an example of brackets that may be used for mounting a specific load.
Figure 8B:
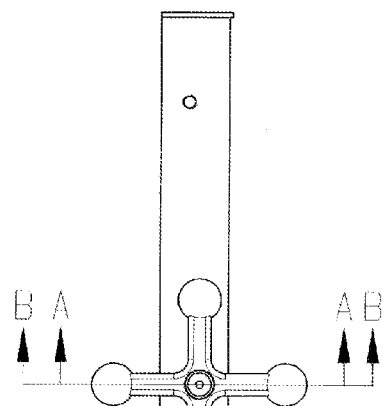
Figure 8C:
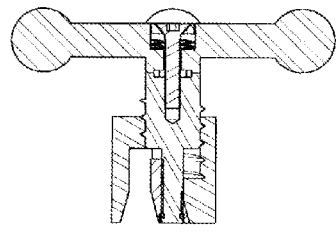
Figure 8D:
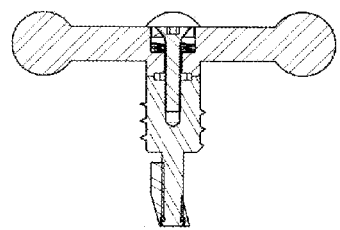
Figure 8E:
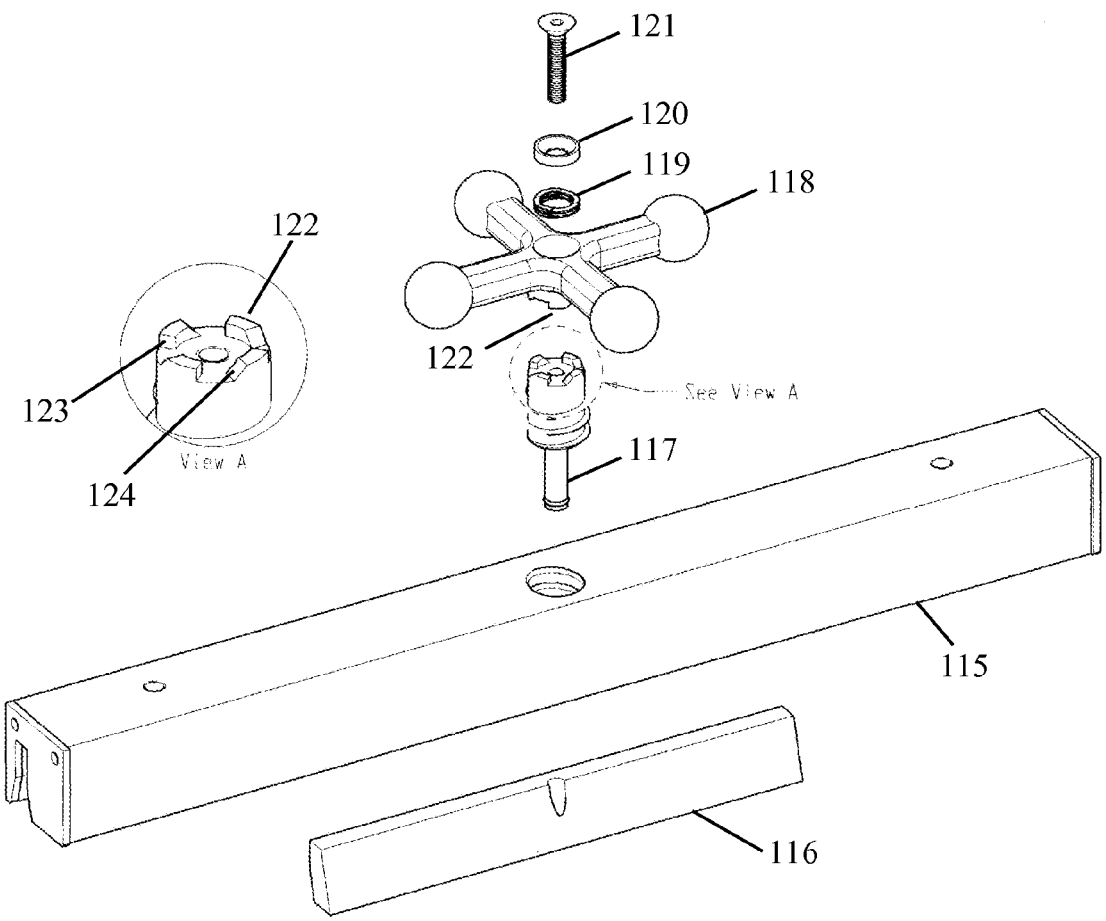
Figure 8F:
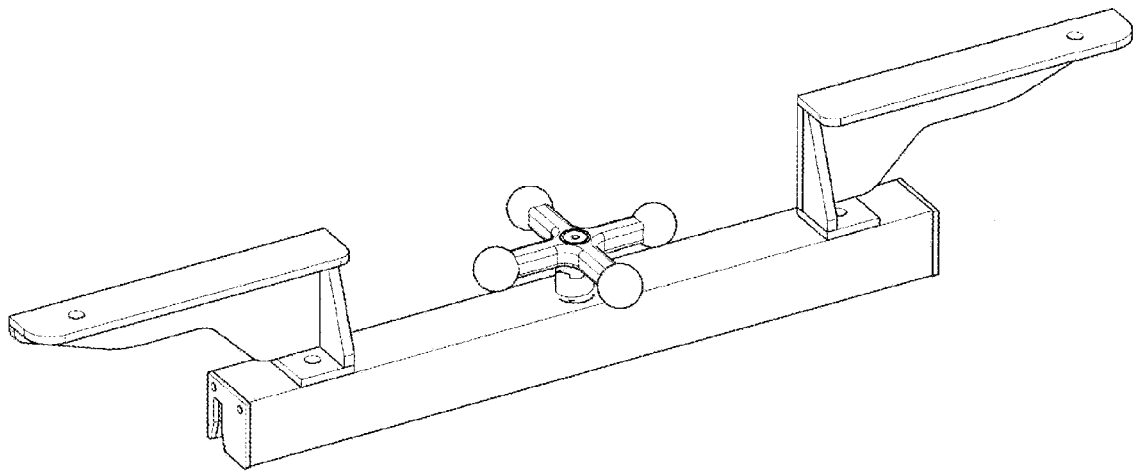
Figure 9B:
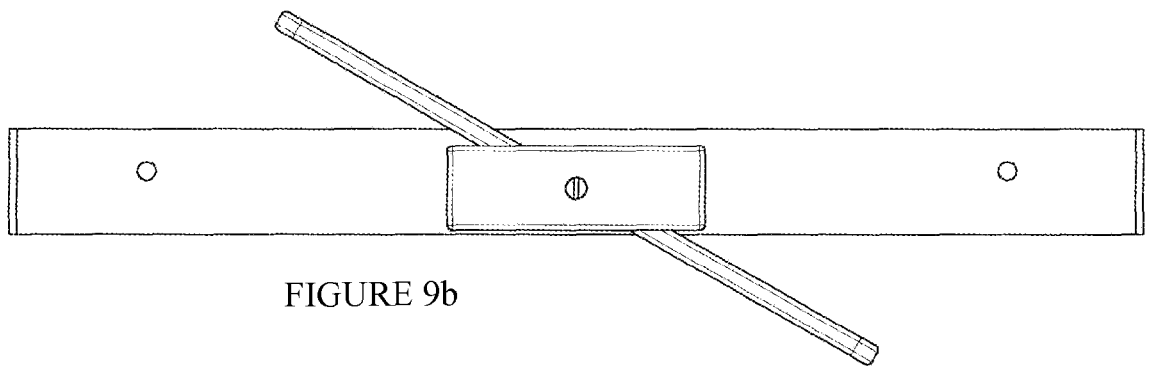
FIG. 9 is a representation of a Mounting Bar Assembly depicting a helical cam lever-actuated type wedge-lock.
 a) isometric view of assembly.
 b) top view of assembly.
 c) side view of b).
 d) an exploded view of a).
 e) bottom isometric view of lever
 f) top isometric view of lever
Figure 9C:
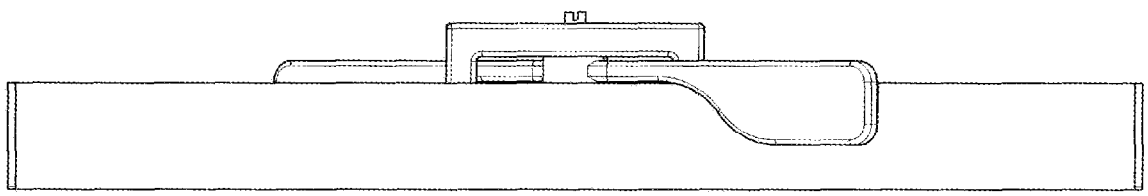
Figure 9A:
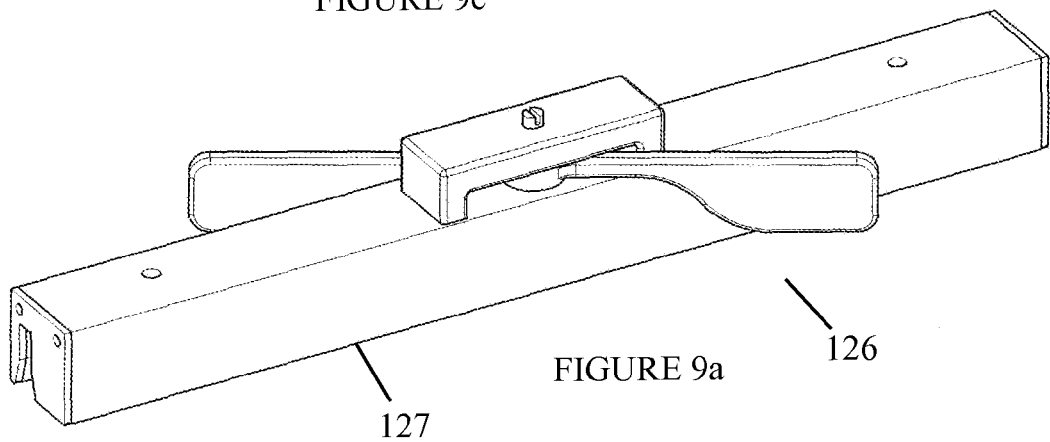
Figure 9D:
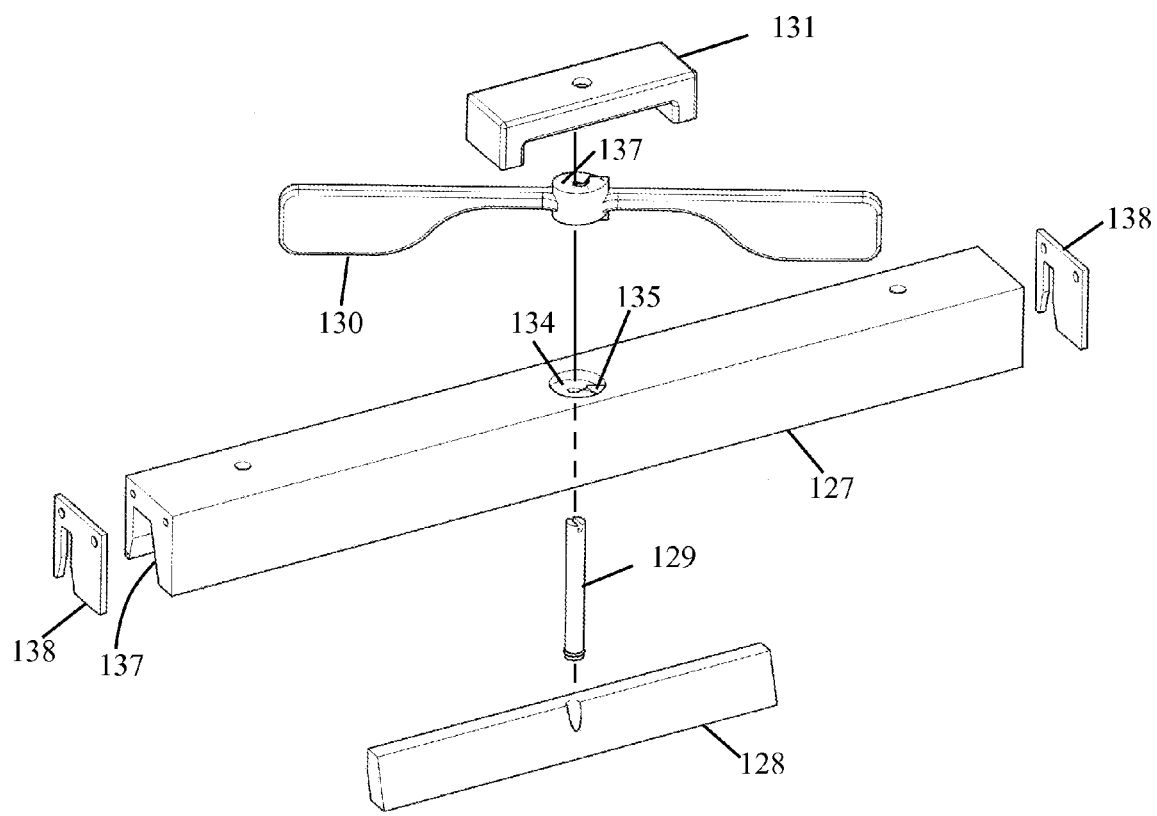
Figure 9F:
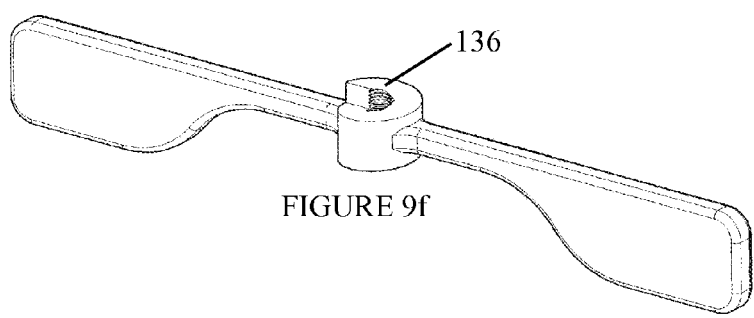
Figure 9E:
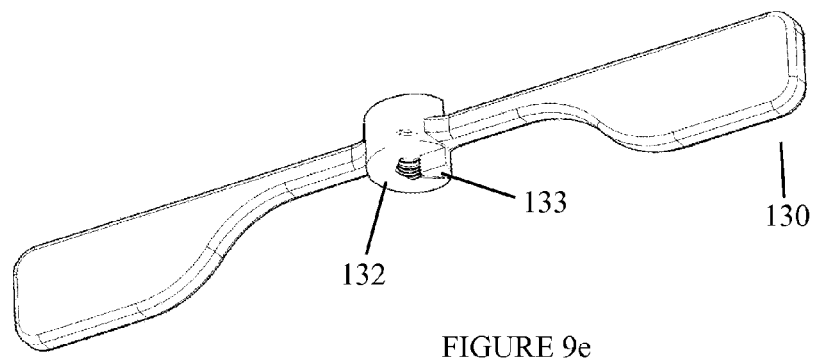
Figure 10A:
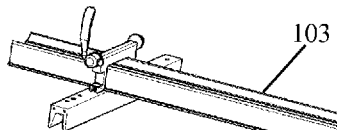
FIG. 10 is a representation of a method to allow for a sliding attachment of the spanner to the Mounting Bar Assembly.
 a) isometric view of an example of a cassette.
 b) isolated area of cassette of sliding attachment.
 c) end view of b).
 d) side view of b).
 e) detailed view of sliding joint.
 f) isometric view depicting one method accomplishing resistive sliding.
Figure 10F:
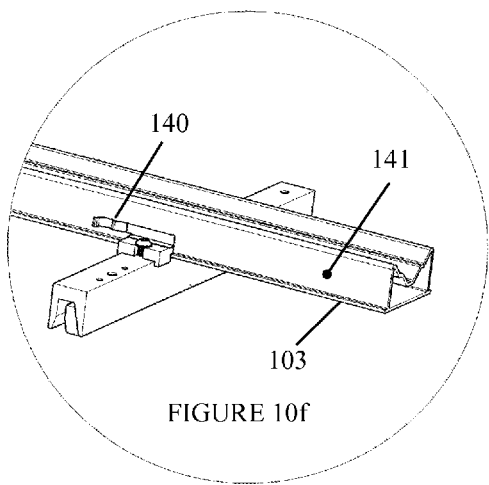
Figure 10B:
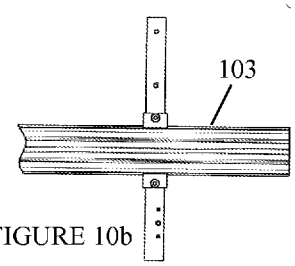
Figure 10D:
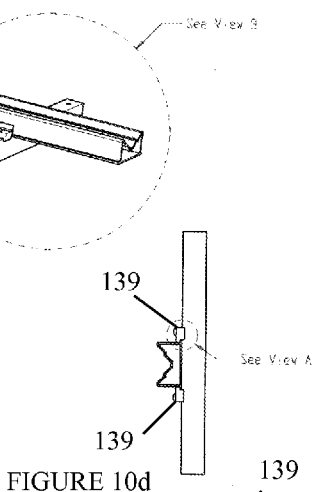
Figure 10C:
Figure 10E:
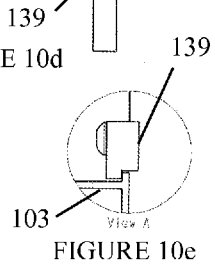

FIG. 7 depict one design method utilizing a wedge-lock system. Referring to FIG. 7, a Mounting Bar Assembly 102 is shown being comprised of Slide Bar 109, Wedge 110, that is displaced by a rotation operation of a Cam Lever 112 inside of Cam Bracket 111. Cam Bracket 111 enables Cam Lever 112 to transmit force to both engage and disengage Wedge 110 from Rail 101 using Adjustment Screw 113. The Cam Lever 112 fixed center of rotation inside Cam Bracket 111 makes it possible to perform engaging and disengaging actions of Wedge 110.

FIG. 8 depict a second design method utilizing a wedge-lock system. Referring to FIG. 8, a Slide Bar Assembly 114 is shown being comprised of Slide Bar 115, Wedge 116, that is displaced by a rotation operation of Screw 117 caused by rotation of Knob 118. Screw 117 is torque limited when Wedge 116 is drawn upwards resulting in horizontal displacement of said Wedge 116 resulting in frictional bind between surface 125 of Rail 101. Torque limiting is achieved by shaping meshed Teeth 122 between Knob 118 and Screw 117 such that a force-controlled slip is possible in desired rotational direction. Slippage occurs between corresponding angled surfaces 124 of said Screw 117 and Knob 118. In opposite direction no slippage is desired and therefore vertical surfaces 123 are parallel to axis of rotation. Threshold point of slippage is adjusted by setting compression of Spring 119 by use of Torque Adjusting Screw 121 backed by Washer 120. FIG. 8f shows one example how Slidable Bar 115 can be fitted with brackets to accommodate a load.

FIG. 9 depict a third design method utilizing a wedge-lock system. Referring to FIG. 9, a Slide Bar Assembly 126 is shown being comprised of Slide Bar 127, Wedge 128, that is displaced by rotation of Lever 130. Lever 130 features a helical sloped surface 132 on both top and bottom portions relative to its position as shown in both isometric and exploded views, FIGS. 9a and 9b respectively. Only on bottom portion of sloped surface 132 is a flat surface 133 seen in FIG. 9e that has a corresponding flat surface 135 blended with sloped helical surface 134 of Slidable Bar 127. These said corresponding flat surfaces 133 and 135 provide point of rotational stability between Slidable Bar 127 and Lever 130. Retaining Cap 131 has corresponding helical sloped surface to helical sloped surface 136 of Lever 130 that performs function to drive Wedge 128 apart from angled surface 137 and Rail Surface 125. Adjustment Screw 129 is used to adjust interference between said surfaces of Wedge 128, Slidable Bar surface 137 and Rail Surface 125. Bar Guides 138 assist user with locating Slidable Bar onto Rail 101.

FIG. 10 detail a floating joint between Spanner and Slidable Bar. FIG. 10e is an example how one might achieve a floating joint. Locating Tabs 139 have clearance between both its horizontal and vertical surfaces and the corresponding surfaces of Spanner 103. This allows both a small angular degree of freedom and an unlimited amount of translational displacement along Spanner 103. Leaf Spring 140 provides enough frictional contact against surface 141 to maintain relative position on Spanner when assembly 100 is not engaged with rails 101.

Figure 11A:
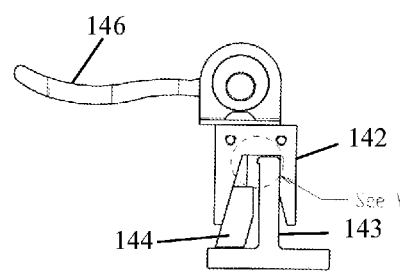
FIG. 11 is a representation of a method to allow for a sliding attachment of the spanner to the slidable portion.
 a) end view of slide bar assembly with safety feature in releasable position.
 b) end view of slide bar assembly with safety feature in locked position.
 c) Detailed view of safety feature in a)
Figure 11B:
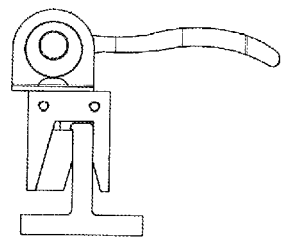
Figure 11C:
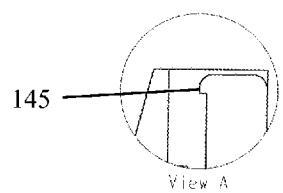
Figure 13A:
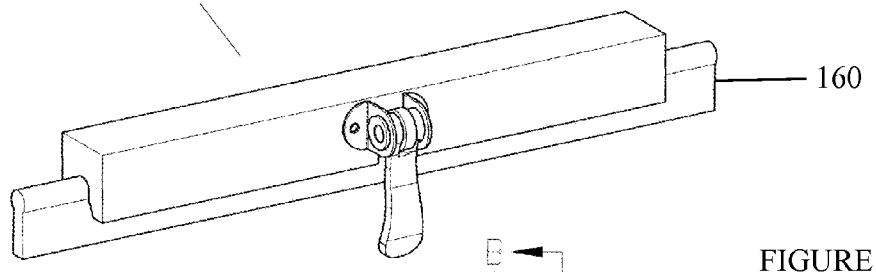
FIG. 13 is a representation of a variation to the design represented in FIG. 12.
 a) isometric view of assembly
 b) top view of a)
 c) side view of b)
 d) cross section view of b)
 e) cross section view of b) not including rail
 f) exploded view of a) not including rail
Figure 13B:
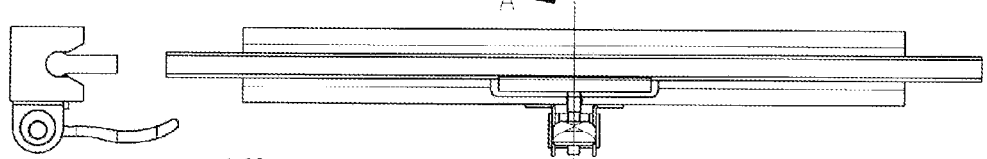
Figure 13C:
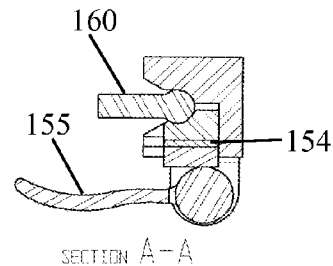
Figures 13D, 13E:
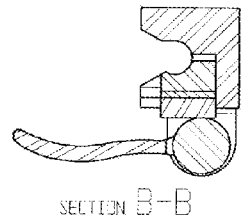
Figure 13F:
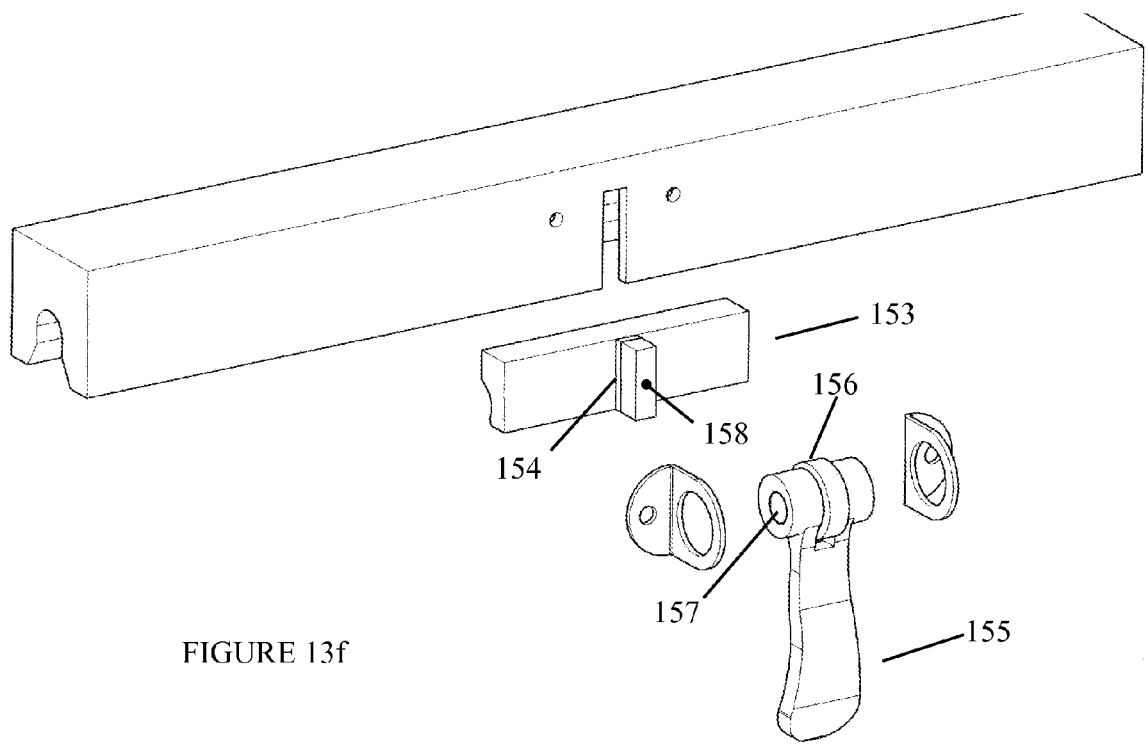
Figure 14A:
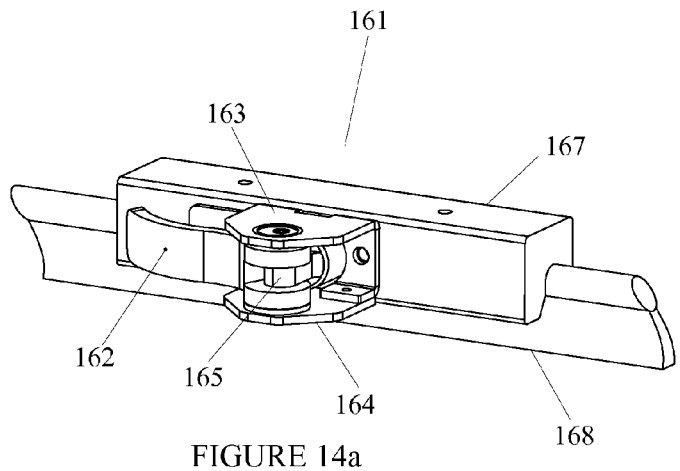
FIG. 14 is a representation of a method to fix the Mounting Bar Assembly to a rail in the fixed position, where it requires greater force to fix said Mounting Bar Assembly to said rail than it does to release or disengage it.
 a) isometric view of the assembly
 b) top view of FIG. 14
 c) front view
 d) bottom view
 e) side view
 f) cross section view of b) through vertical axis of camming device
 g) exploded view of assembly
Figure 14B:
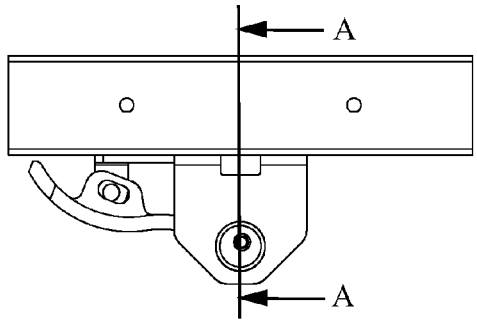
Figure 14F:
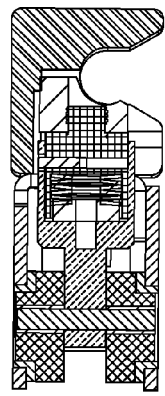
Figure 14C:
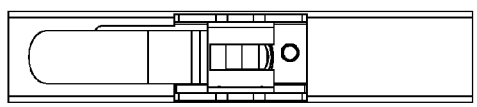
Figure 14E:
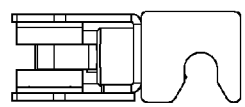
Figure 14D:
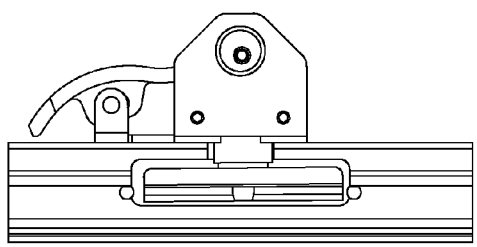
Figure 14G:
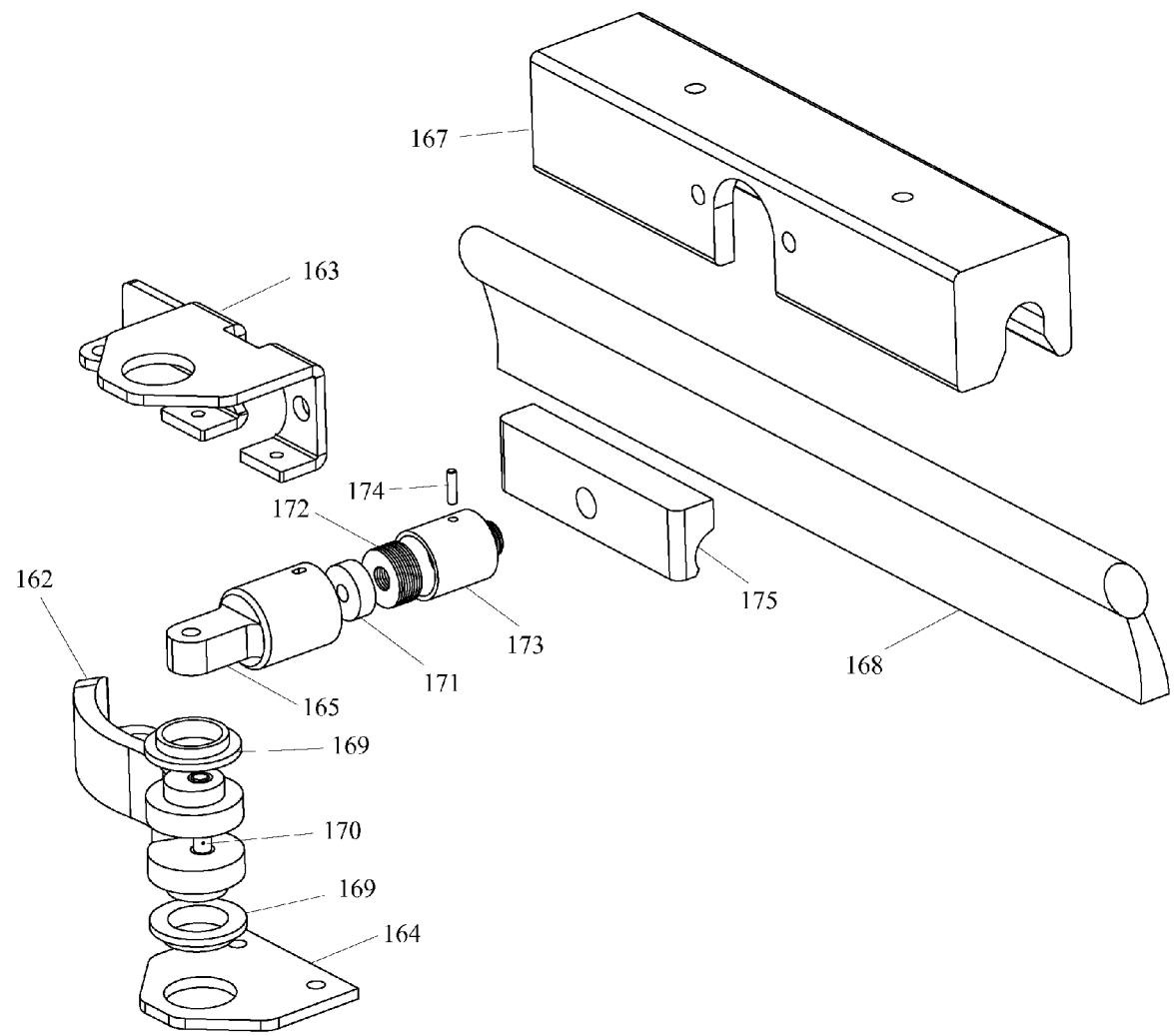
Figure 15A:
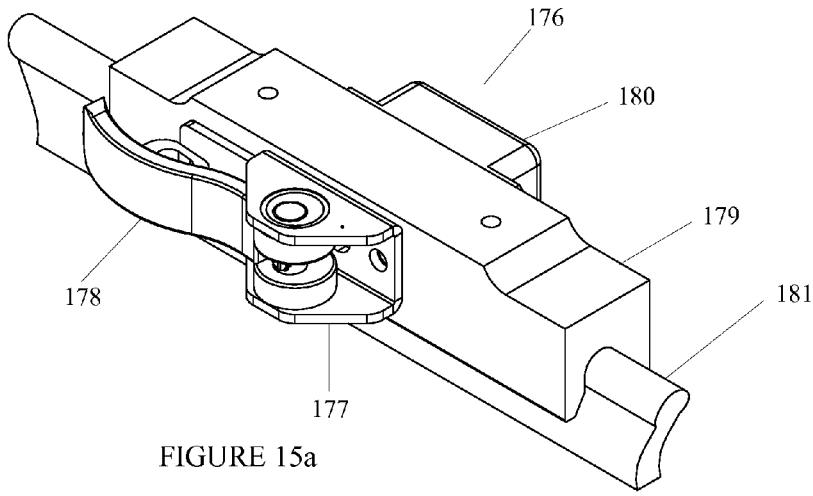
FIG. 15 is a representation of a method to fix the Mounting Bar Assembly to a rail in the fixed position, where it requires less force to fix said Mounting Bar Assembly to said rail than it does to disengage it.
 a) isometric view of the assembly with the lever in the open or free position
 b) front view of FIG. 15
 c) bottom view
 d) back view
 e) side view
 f) cross section view of c) through vertical axis of camming device
 g) exploded view
Figure 15B:
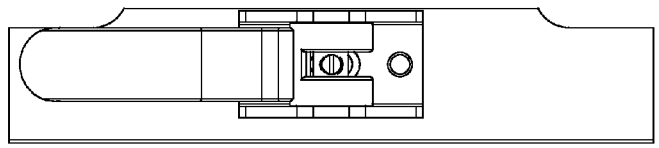
Figure 15E:
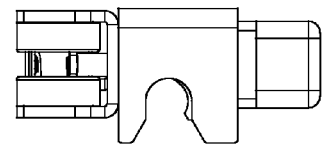
Figure 15C:
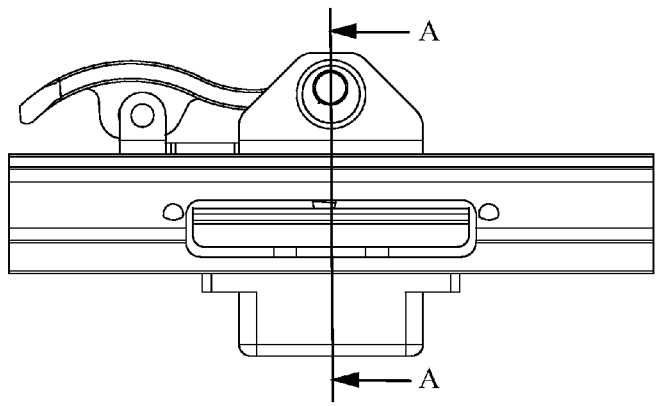
Figure 15F:
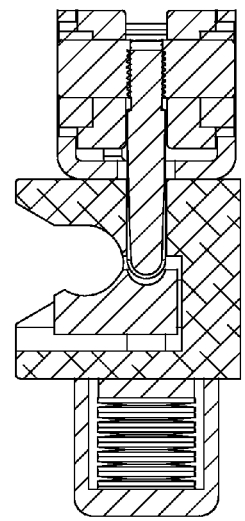
Figure 15D:
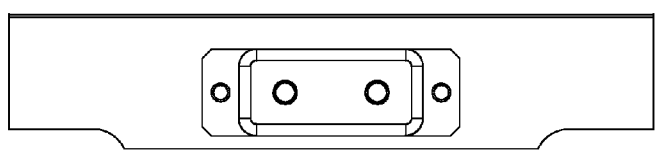
Figure 15G:
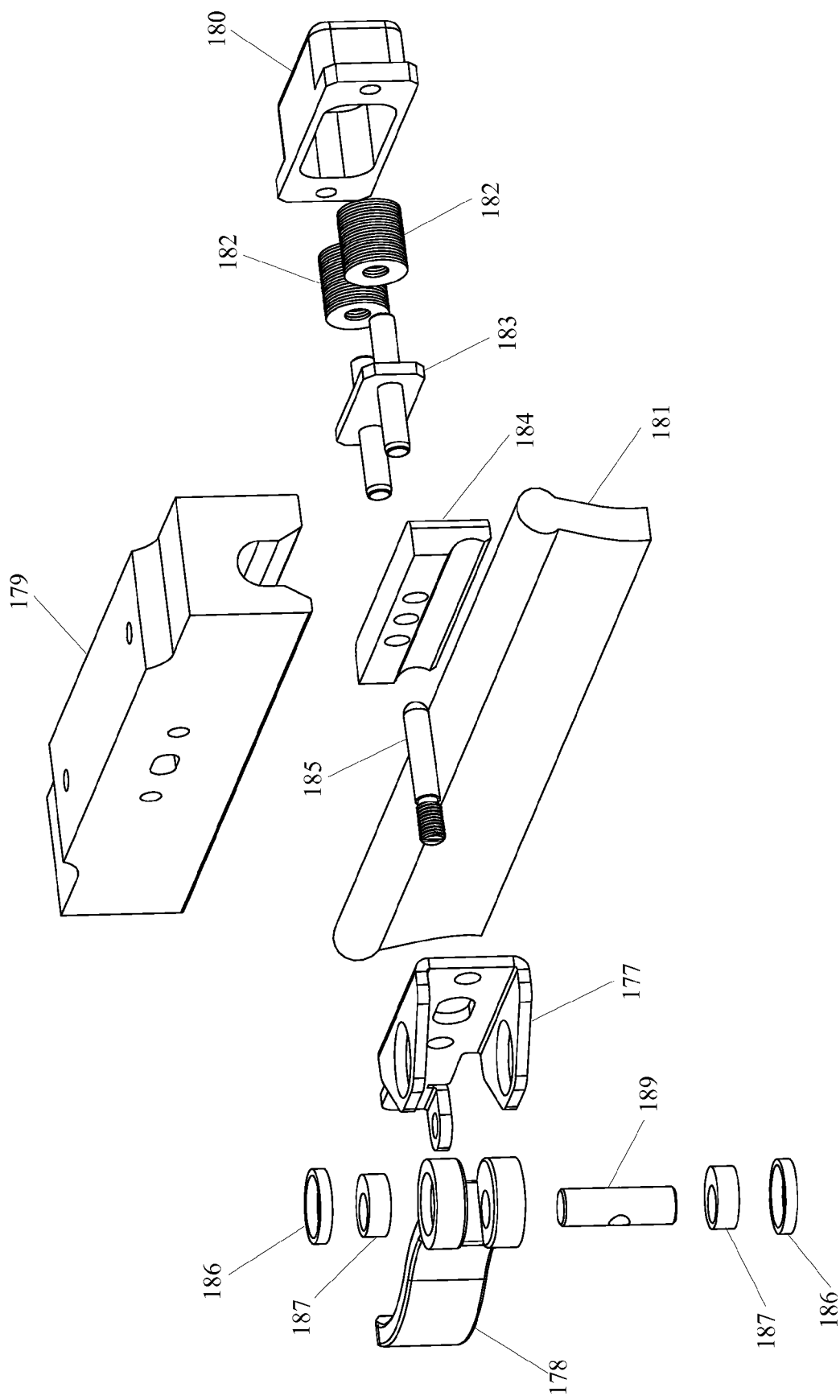

FIG. 11 depict how one might achieve a safety catch to prevent Slidable Bar 142 separating from Rail 143 if locking levers or knobs accidentally loosen or if binding Wedge 144 is out of adjustment. Rail 143 has a Ledge 145 feature that catches top surface of Wedge 144 if Cam Lever 146 is not fully opened.

FIG. 12 depict another design method to lock a Mounting Bar Assembly 147 to a Rail 148. A friction-binding lock between Mounting Bar Assembly 150 and Rail 148 is achieved when Cam Lever 149 is moved or rotated to a position such that it draws Clamp Bar 152 against Rail 148 utilizing Tension Adjusting Screw 151 as force transmission member. Rotation of Mounting Bar Assembly 150 on longitudinal axis of Rail 148 is made possible by angular clearance between fitted parts Slidable Bar 147 and Clamp Bar 152.

FIG. 13 depict a variation of design method illustrated in FIG. 12. Clamp Bar assembly 153 has compressible element 154 utilized to eliminate need for adjusting screw in FIG. 12 by taking advantage of direct contact between Roller 156 and Clamp Bar Contact Surface 158. Roller 156 is fixed to Axle 157 of Cam Lever assembly 155. Not shown in FIG. 13 is method to retract Clamp Bar assembly 153 by direct engagement with Roller 156 thereby allowing separation of Bar assembly 159 from Rail 160.

FIG. 14 depicts a variation of method in FIG. 12. The difference is this mechanism is forgiving in the tolerances or needing less fine adjustment for it to work according to design by employing the use of spring(s) which act as the forgiving element. For discussion purposes the Mounting Bar Assembly can be further broken down into a mounting bar subassembly and camming mechanism subassembly. The subassembly is comprised of Spring Housing 165, Spacer 171, Cup Springs 172, Pre-load Cup 173, Pre-load Stop 174, and Contact Bar 175 having semi round profile with the lower portion or bottom of arc able to make contact with undercut on Rail 168. Caroming mechanism subassembly comprised of Bushing 169, Lever 162, Shaft 170, Upper Bracket 163, and Lower Bracket 164. Shaft 170, upon which engages Spring Housing 165 of mounting bar subassembly is positioned eccentric to bearing surface of Lever 162 such that when said Lever 162 is rotated in said bearing surface, mounting bar subassembly is translated either away from or into contact of Rail 168. Cup Springs 172 are preloaded in Mounting Bar subassembly such that when said subassembly is thrust into contact with Rail 168 further compression of Cup Springs 172 results providing an interference contact tolerance between said Rail 168 and Contact Bar 175. The resulting force generated in further compression of Cup Springs 172 is sufficient to fix said Mounting Bar Assembly to said Rail 168.

FIG. 15 depicts a method to fix Slidable Bar 179 of the Mounting Bar Assembly to a Rail 181 with a partially round profile. Slidable Bar 179 has internal profile to accommodate corresponding profile of Rail 181 allowing said Slidable Bar 179 to slide relative to or be separated from said Rail 181. Camming Lever 178 is mounted into Mounting Bracket 177 with Eccentric Cam 187 and Bushing 186. Push Rod 185 fastens to Shaft 189 which said Camming Lever 178 rotates about. When Camming Lever is rotated, Push Rod is either thrust into Contact Bar 184 to release said Contact Bar 184 from fixed position against said Rail 181 or when rotated the opposite direction said Push Rod 185 is withdrawn to a position that allows preloaded springs to thrust said Contact Bar 184 into said Rail 181 with sufficient force to fix both relative to each other. Contact Bar 184 has concavity to accept hemispherical end of Push Rod 185. Guide 183 has guide pins on one side that slide into corresponding bores of Contact Bar 184, and guide posts on the opposite side that Cup Springs 182 fit around. Spring Housing 180 is a protective cover for assembly.

I claim:

1. A device as part of a utility rack system used to transport articles capable of use with vehicles and trailers in tow by said vehicles comprising in combination:
   a) at least two rigid elongated members hereinafter more conveniently referred to as rail(s), attached to vehicle or trailer with said rail's longitudinal sides mounted as parallel as possible to each other,
   b) a cassette having means to attach or carry articles for transport or storage being assembled with two or more bar assemblies and a rigid member connecting said bar assemblies, said rigid member can either be an integral element to the cassette or the load itself, said bar assemblies having slots of a shape to receive said rails; said slot shapes of sufficient size to allow sliding along longitudinal length of said rails, said bar assemblies having means to negate spatial clearance between said bar assembly and said rail in at least one axis normal to longitudinal axis of said rail thereby having means to temporarily or removably fix said cassette to said rail.

2. The device according to claim 1 wherein bar assembly is comprised of a bar with a general "U" cross sectional shape having one straight wall and one tapered wall inwardly disposed from open end of "U", a wedge also having one straight surface and one opposed tapered surface parallel with bar's tapered surface and is intentionally displaced in a plane perpendicular to said rails along said surfaces, said displacement in a direction perpendicular to said rails causes a substantial lateral or horizontal displacement, negating clearance between straight surfaces of said wedge and said rail with sufficient opposing forces to statically bind said bar-wedge assembly and said rail together, and an actuator having means to cause said intentional displacement of said wedge along contacting surfaces of said wedge and said rail.

3. The device according to claim 2 wherein said actuator having means to cause wedge displacement is caused by forcible rotation of a cam.

4. The device according to claim 3 wherein said cam is lever operated, said cam lever is rigidly connected to large cylindrical body, said large cylindrical body having eccentrically placed hole through said large cylindrical body along longitudinal axis, a small cylindrical body of slightly smaller diameter dimension as said hole in said large cylindrical body slidably fitting inside said hole, said small cylindrical body having means to attach said wedge, a bracket having means to fix large cylindrical body or cam rotation center, such that when cam lever is operated, said wedge is forcibly translated in either said substantially opposed vertical directions.

5. The device according to claim 4 further including a means to lock said cam lever in position that binds said wedge against said rail.

6. The device according to claim 2 wherein: said actuator having means to cause wedge displacement is caused by forcible rotation of a screw.

7. The device according to claim 6 wherein: said bar of said bar assembly has hole with screw pitch in vertical axis to accept screw with mating screw hole pitch, said screw having a plurality of teeth on upper end of screw body, said teeth project outward from said surface in direction parallel to screw axis, said teeth have a sloped surface, a vertical surface, and a horizontal surface relative to axis of screw threads, said sloped surface is oriented with positive or upwards slope in same rotational direction that raises screw relative to said bar, said screw at end opposite said teeth having means to loosely attach said wedge, a knob with mating teeth or of corresponding said sloped, said vertical, and said horizontal surfaces at its bottom side, a spring that seats on surface opposite said knob's bottom surface, a fastener with means to hold said screw, said knob, and said spring assembly together, rotating said knob in direction causing screw to raise in vertical direction causes said wedge and said screw to also raise by means of engaging correspondingly sloped surfaces between said knob and said screw, torque applied to said knob in raising said wedge and causing static binding between said wedge and said bar is controlled or limited by physical characteristics of said spring, reversing rotational direction of said knob causes said vertical surfaces of teeth between said knob and said screw to engage thereby forcibly transmitting a downward force causing friction bind between said wedge and said bar to break.

8. The device according to claim 6 further including a means to lock cam lever in position that binds said wedge against said rail.

9. The device according to claim 2 wherein said rails are rigidly supported at both ends by a base, said base also allows for said rails to be independently rotationally adjustable in axis parallel to longitudinal axis of said rails for means to enable user to make rail surfaces parallel thereby enabling engagement between said rails and said cassette assembly.

10. The device according to claim 2 wherein said cassette is comprised of two said bar assemblies and spanner where in at least one bar assembly is slidably attached to said spanner allowing for sliding translation in axis parallel to spanner and free rotation of said bar assembly relative to said spanner in axis normal to longitudinal axis of said bar or said rail providing means to compensate for said rails' non parallelness, the result of imperfect mounting of said rails.

11. The device according to claim 2 wherein said rail has at least one substantially vertical wall.

12. The device according to claim 11 wherein a portion of said rail's surface has a protrusion extending in direction normal from surface between bottom and top surfaces of said rail along its longitudinal length providing means to prevent undesired release of said sliding bar assembly from said rail, forcing said wedge into position such that said surfaces of both said wedge and said bar disengage, said bar is thereby free to separate from said rail.

13. The device according to claim 11 wherein a lever, a handle or some other actuating feature of binding mechanism thereof has means in its position to force said wedge into said disengaging position.

14. The device according to claim 1 wherein bar assembly which mounts to said rail is comprised of a bar with general 'U' cross section shape, said rail having a cross sectional shape with upper portion wider than lower portion hereinafter referred to as head.

15. The device according to claim 14 wherein said actuator having means to cause clamping bar displacement is caused by forcible rotation of cam.

16. The device according to claim 15 wherein said bar assembly is comprised of a rigid slidable bar and clamping means comprised of a cam having means for forced rotation or actuation, said cam with large cylindrical body shape having eccentrically placed hole through said large cylindrical body along longitudinal axis, a small cylindrical body of slightly smaller diameter dimension as said hole in said large cylindrical body slidably fitting inside said hole, said small cylindrical body having means to attach clamping bar, a bracket having means to fix large cylindrical body or cam rotation center, such that when cam lever is operated, said clamping bar is forcibly translated into or away from said rail, said clamping bar having cross sectional shape with a portion of surface oriented such that when clamping bar is forced into contact with rail the resulting force vector forces said rail against wall of said "U" with sufficient force to bind it against said rail, also said clamping bar having a portion of surface protruding into space under said head of rail for better securement of clamping bar to said rail, operating said cam in opposite direction to said clamping actuation of said cam moves clamp bar to most opposed clamped position enabling removal of said bar assembly from said rail, when said cam is in intermediate position or between extreme positions portion of clamp bar remains protruded into space under said head of said rail preventing inadvertent separation between said bar assembly and said rail.

17. The device according to claim 16 wherein said small cylindrical body acts directly on said clamping bar, said clamping bar made of both incompressible and compressible materials.

18. The device according to claim 16 wherein said cassette comprised of two said bar assemblies and said spanner where in at least one bar assembly is slidably attached to said spanner allowing for sliding translation in axis parallel to spanner and free rotation of said bar assembly relative to said spanner in axis normal to longitudinal axis of said bar or said rail providing means to compensate for said rails' non parallelness, the result of imperfect mounting of said rails.

19. The device according to claim 16 wherein said bar assembly's clamping mechanism is comprised of a clamping bar, a spring loaded intermediate element rigidly connected to said clamping bar on one end, said spring loaded intermediate element connected rotationally free on opposite end by shaft extending through holes of both said intermediate element and eccentrically positioned hole in said cam, operation of said cam in direction to thrust said clamp bar against said rail compresses said springs in said intermediate element, compression of said springs in operation of said cam compensates for dimensional differences between total connected length of spring preloaded intermediate element and said clamping bar and distance between center of said shaft in said cam and said surface of rail that said clamp bar contacts when said cam is in clamped position.

20. The device according to claim 14 wherein said bar assembly's clamping mechanism is comprised of a clamping bar, a spring loaded element having at least one guide rod on which said clamping bar is guided, a push rod that acts against said clamp bar when said cam is in position such that said clamp bar is pushed away from said rail causing enough separation from said rail for said bar assembly to either slide or be removed from said rail, said preloaded springs provide clamping force between said clamp bar and said rail when cam is in least energy state, when said springs are further compressed by said cam in position of higher energy state said bar assembly is free to slide along said rail or be removed from said rail.

* * * * *